United States Patent [19]

Schwarz et al.

[11] Patent Number: 4,906,102
[45] Date of Patent: Mar. 6, 1990

[54] APPARATUS FOR MIXING THERMOPLASTIFIED SYNTHETIC RESINS

[75] Inventors: Wilfried Schwarz, Königswinter; Peter Stommel, Hennef, both of Fed. Rep. of Germany

[73] Assignee: Reifenhäuser GmbH & Co. Maschinenfabrik, Troisdorf, Fed. Rep. of Germany

[21] Appl. No.: 333,990

[22] Filed: Apr. 5, 1989

[30] Foreign Application Priority Data

Apr. 8, 1988 [DE] Fed. Rep. of Germany ....... 3811787
Jun. 9, 1988 [DE] Fed. Rep. of Germany ....... 3819605

[51] Int. Cl.$^4$ ............................ B29B 1/06; B01F 15/02
[52] U.S. Cl. ......................................... 366/76; 366/86; 366/99; 366/299; 366/91; 425/145; 425/200
[58] Field of Search ....................... 366/69, 76, 77, 78, 366/79, 83, 84, 86, 90, 96, 97, 98, 99, 292, 297, 298, 299, 318, 324, 91; 425/145, 200

[56] References Cited

U.S. PATENT DOCUMENTS

| 3,782,700 | 1/1974 | Wittrock | 366/76 |
| 3,790,136 | 2/1974 | Koch | 366/86 |
| 4,253,771 | 3/1981 | Renk | 366/89 |
| 4,419,014 | 12/1983 | Gale | 366/99 |
| 4,473,299 | 9/1984 | Guibert | 36/76 |
| 4,479,884 | 10/1984 | Clarke | 366/99 |
| 4,721,589 | 1/1988 | Harris | 425/145 |

FOREIGN PATENT DOCUMENTS 8501911 9/1985 Japan .

Primary Examiner—Robert W. Jenkins
Attorney, Agent, or Firm—Herbert Dubno

[57] ABSTRACT

An extruder feeds a thermoplastified flow of synthetic resin to at least one mixing unit which is driven independently of the extruder and has a rotor and stator with mutually facing pockets and defining a gap between them traversed by the thermoplastified flow and into which an additive is pumped at an upstream end so as to obtain an especially homogenius distribution of the additive in the thermoplastified flow.

9 Claims, 3 Drawing Sheets

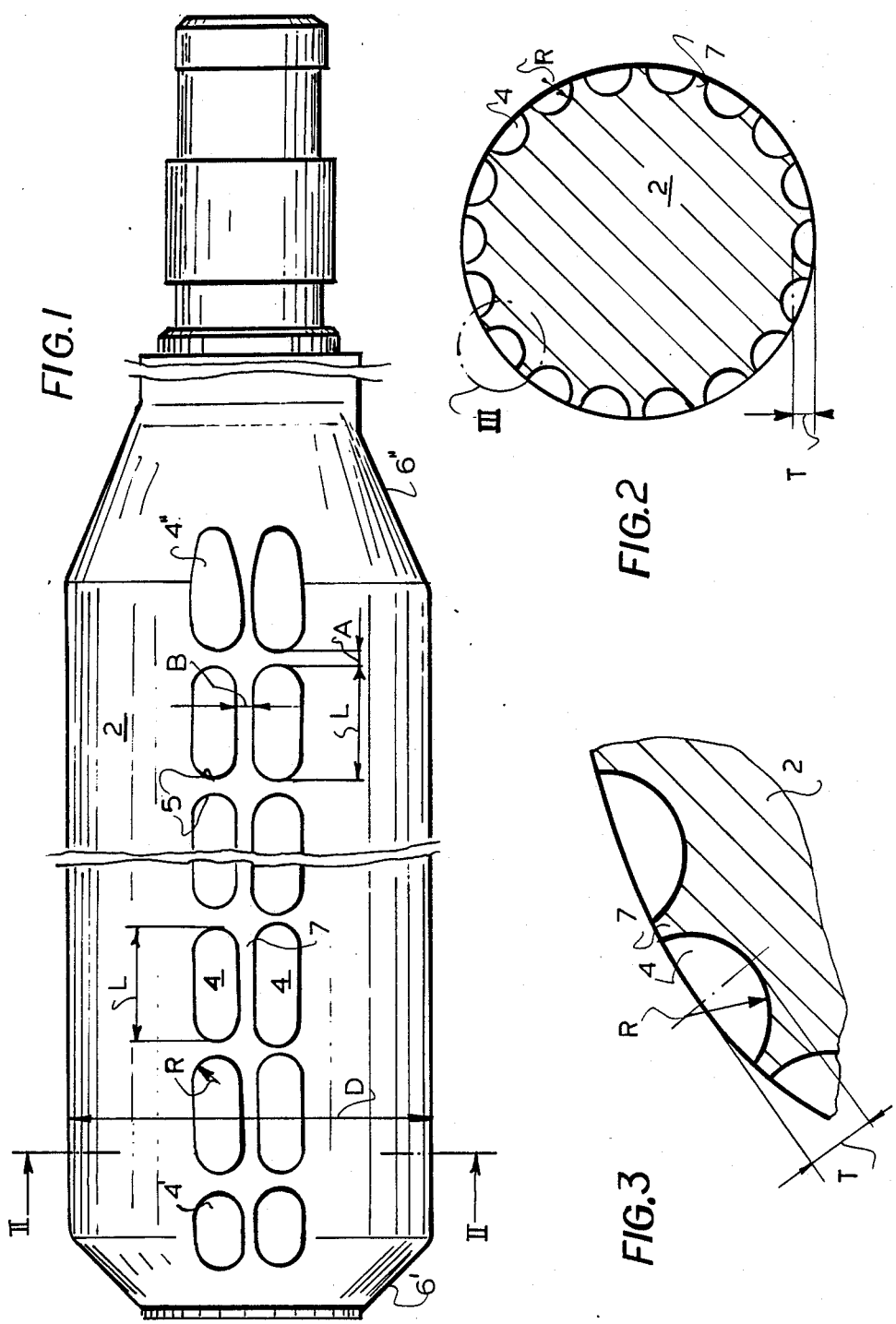

APPARATUS FOR MIXING THERMOPLASTIFIED SYNTHETIC RESINS

CROSS REFERENCE TO RELATED APPLICATIONS

This application is related to the commonly assigned copending application Ser. No. 07/159,096 filed 23 Feb. 1988 and to our concurrently filed copending application Ser. No. 333,981 filed Apr. 5, 1989 based upon German Patent application P 3811785.1 filed 8 Apr. 1988.

FIELD OF THE INVENTION

Our present invention relates to an apparatus for the mixing of thermoplastified synthetic resins with additives which can be other thermoplastified synthetic resin or yet other materials miscible with thermoplastic synthetic resins. More particularly, the invention relates to an apparatus which includes at least one thermoplastifying worm-type press or extruder for generating a flow of the thermoplastified synthetic resin material and at least one mixing unit driven independently of the worm-press at which at least one additive is blended with the thermoplastified synthetic resin.

BACKGROUND OF THE INVENTION

In the International Patent Document WO85/01,911 and the prior United States application mentioned above, a device for mixing thermoplastified synthetic resin has been described in which the device comprises a rotor and a stator defining a gap between them. Both the rotor and the stator, in confronting surfaces bounding the gap, are provided with circumferentially extending rows and axially extending rows of mixing chambers or pockets which are identical and have an elongated outline. The upstream and downstream ends of each of the mixing chamber has a semicircular shape with a given radius. The numbers of mixing chambers in the circumference rows and the axial rows of the rotor coincides with the number of mixing chambers in the corresponding rows of the stator and the circumferential rows of the rotor are offset axially from the circumferential rows of the rotor by about ½ the length of the mixing chambers.

The device of the International Application WO85/01911, while generally satisfactory, has been found to be capable of improvement as to mixing efficiency and with respect to the cost of fabrication and the techniques which are required to make such mixing units.

Especially in the case where thermoplastified synthetic resin flows are produced in extruders, it is frequently necessary to incorporate additives such as pigments or other coloring agents in the main flow of the synthetic resin and/or to incorporate therein other synthetic resins and other materials, frequently referred to as "alloying" elements and, in some cases, even a plurality of separate additives. Prior mixing systems have required introducing these materials in the worm-press which has not always proved to be satisfactory.

OBJECTS OF THE INVENTION

It is, therefore, the principal object of the present invention to provide an improved apparatus for mixing thermoplastified synthetic resins whereby the above and other drawbacks are avoided.

Another object of our invention is to provide a method of operating the improved apparatus and consequently, an improved method of mixing thermoplastified synthetic resins.

A third object of this invention is to provide an improved apparatus for the purposes described whereby additives can be blended in an especially simple way into a flow of a thermoplastified synthetic resin in a highly effective and efficient manner to yield a particularly homogeneous mixture.

SUMMARY OF THE INVENTION

These objects and others which will become apparent hereinafter are achieved, in accordance with the invention in an apparatus in which the or each mixing unit has a rotor and stator as thus described but which is characterized by the following combination of features:

A. Each mixing chamber is formed as a trough which in a radial section has a circular arc segmental shape with a radius equal to the aforementioned given radius and with a trough depth which is less than this radius;

B. The mixing chambers each have a length which is substantially 3 to 4 times the given radius;

C. The webs between the mixing chambers in the surfaces of the rotor and stator have a web width (thickness) which is less than ½ the given radius;

D. The shear gap width between the outer surface of the rotor and the inner surface of the surrounding stator is so elected that a sufficiently large shear velocity gradient is generated; and E. The rotor is driven by its own drive independently of the worm-press and can have a controllable or regulatable drive, while the thermoplastified synthetic resin is fed from the worm-press to the independent mixing unit and the additives is supplied at one or more locations around the periphery of the rotor to the gap at the upstream end of the rotor by a pump which constitutes another element of the apparatus combination.

The additives can be independently supplied by respective pumps or can be fed in mutual admixture by a single pump.

Advantageously, a thermally insulated flexible or rigid conduit can connect the upstream worm or screw press with the mixing unit or a plurality of mixing units which can be spaced therefrom.

The combination of the invention appears to give rise to unusual hydrodynamic effects which ensure an especially intensive mixing and thus a very homogeneous distribution of the additive in the flow of the thermoplastified resin.

In the mixing operation of the invention, the temperature and pressure are so established that the thermodynamics and physics of the flow can accommodate changes in parameters of the thermoplastified synthetic resin, for example, the viscosity on the one hand of the thermoplastified synthetic resin and on the other hand of the additive.

According to the invention, means can be provided by heating the stator and this heating can be controlled or regulated in response to a control or regulating apparatus.

Preferably the pump is dimensioned so that the additive will be fed to the gap at a higher static pressure of the thermoplastified synthetic resin in the gap.

The pump may thus be appropriately controlled or regulated, e.g. as to speed, for this purpose.

The additives which can be used are any of those which are conventionally employed in the processing of thermoplastified synthetic resin and, of course, must be pumpable. The invention is of particular interest for so-called liquid colorant which are conventionally utilized in the coloring of thermoplastic synthetic resins. Other alloying elements of synthetic resin, such as polyisobutylene, PIB, or other polymeric substances can be used.

In apparatus terms, therefore, the system of the invention comprises:
a worm press having:
a cylinder,
a plastifying screw rotatable in the cylinder and generating a flow of a thermoplastified synthetic resin fed to the worm press whereby the snthetic resin is thermoplastified therein and displaced in a flow along the worm press, and
a worm-press drive connected to the screw for driving same;
at least one mixing device communicating with the worm press, receiving the flow therefrom and driven independently from the worm press, the mixing device comprising:
rotor along the path of the flow rotating with having a peripheral surface,
a stator surrounding the rotor having a peripheral surface juxtaposed with the peripheral surface of the rotor so that the surfaces define an axially extending annular gap between them, each of the surfaces being formed with a plurality of angularly equispaced axially extending rows of axially elongated mixing chambers of identical outline each with semicircular ends of a given radius, the mixing chambers of the surface of the rotor being axially offset from the mixing chambers of the surface of the stator by substantially half the length of the mixing chambers, the mixing chambers being troughs of circular arc segmental cross section with radii of curvature equal to the given radius and depths less than the given radius, the length of each mixing chamber being three to four times the given radius, the mixing chambers of successive rows of each surface being separated by webs having a thickness less than half of the given radius and the ga having a gap width generating a shear velocity gradient sufficient to effect intimate mixing in the gap of the flow as the flow passes through the gap, and
a mixing-unit drive operatively connected with the rotor for driving same independently of the screw; and
a pump communicating with a source f a pumpable additive to be admixed with the flow connected to the stator at at least one location around the rotor and at an upstream end of the gap, for feeding the pumpable additive into the gap for admixture to the thermoplastified synthetic resin, thereby blending the additive with the thermoplastified synthetic resin.

The invention, of course, has a method aspect and the method can comprise the steps of:
(a) generating a flow of a thermoplastified synthetic resin by rotatably driving a plastifying screw in a cylinder of a synthetic-resin-displacing worm press and feeding the synthetic resin to the worm press whereby the synthetic resin is thermoplastified therein and displaced in a flow along the worm press and from the worm press;
(b) along the path of the flow but separately from the worm press, rotating a rotor independently of the rotation of the screw and having a peripheral surface juxtaposed with a peripheral surface of a stator surrounding the rotor so that the surfaces define an axially extending annular gap between them, each of the surfaces being formed with a plurality of angularly equispaced axially extending rows of axially elongated mixing chambers of identical outline each with semicircular ends of a given radius, the mixing chambers of the surface of the rotor being axially offset from the mixing chambers of the surface of the stator by substantially half the length of the mixing chambers, the mixing chambers being troughs of circular arc segmental cross section with radii of curvature equal to the given radius and depths less than the given radius, the length of each mixing chamber being three to four times the given radius, the mixing chambers of successive rows of each surface being separated by webs having a thickness less than half of the given radius and the gap having a gap width generating a shear velocity gradient sufficient to effect intimate mixing in the gap;
(c) passing the flow through the gap; and
(d) pumping into the gap at at least one location around the rotor and at an upstream end of the gap, at least one pumpable additive miscible with the thermoplastified synthetic resin, thereby blending the additive with the thermoplastified synthetic resin.

BRIEF DESCRIPTION OF THE DRAWING

The above and other objects, features and advantages of my invention will become more readily apparent from the following description, reference being made to the accompanying highly diagrammatic drawing in which:

FIG. 1 is a side elevational view of a rotor of a mixing device for use in accordance with the invention;

FIG. 2 is a section taken along the line II—II of FIG. 1;

FIG. 3 is an enlarged detailed view of the region III of FIG. 2;

SPECIFIC DESCRIPTION

Figure 6:
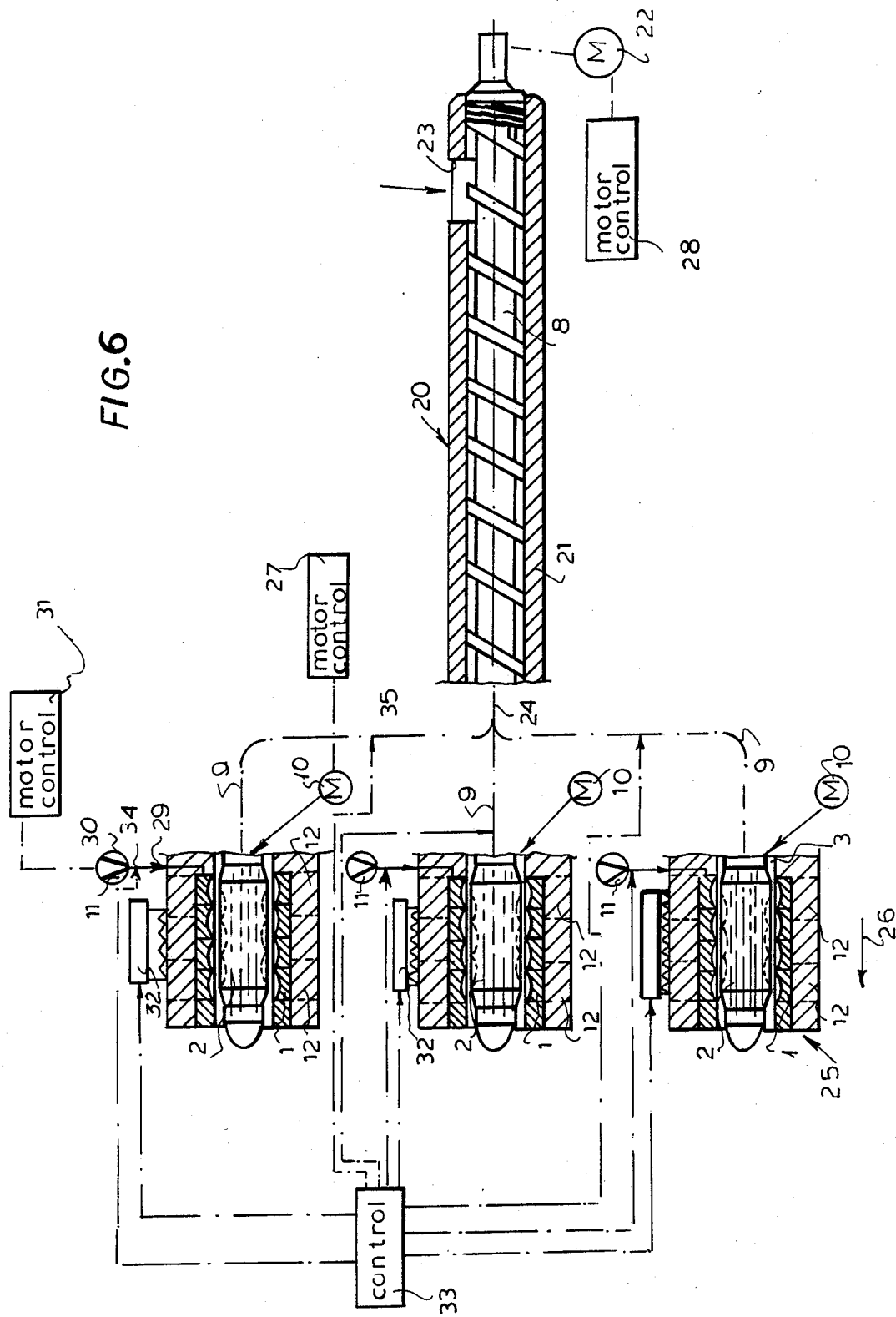
FIG. 6 is a diagrammatic sectional view illustrating additional principals of the invention.

As can be seen from FIG. 6, a worm press generally represented at 20 can be seen to comprise a worm 8 rotatable in a cylinder 21 and connected to a drive motor 22, e.g. by speed reducing gearing which has not been shown. Synthetic resin material to be mixed is introduced through an inlet 23 at one end of the cylinder 21 and a thermoplastified flow of this synthetic resin is discharged at the other end at 24 as illustrated diagrammatically. If the shear generated by rotation of the worm or screw 8 is insufficient to thermoplastify the synthetic resin, the worm-press can be provided with heaters at appropriate locations along the cylinder. The outlet 24 and the ducts 9 delivering the thermoplastified flow to one or more mixing units 25 are thermally insulated.

It, thus, will be apparent that the parts of the mixing unit of FIGS. 1 through 5 are assembled to provide the configuration of the mixing units 2 shown in FIG. 6 and the mixing units are each connected to a worm-press 20, i.e. to a so-called extruder.

The outer diameter D of the rotor 2 and hence the inner diameter of the stator 1 can be greater, if desired, than the outer diameter of the worm 8 and the inner diameter of the cylinder 21.

When the rotor 2 and the stator 1 are assembled as has been shown in FIG. 6 for the units 25, the outer surface of each rotor and the inner surface of each stator defines a gap 3 which will be referred to herein as a sheared gap and which is traversed in the flow direction 26 by the thermoplastified flow.

The rotor 2 and the stator 1 are formed with axially elongated mixing chambers 4 in the form of pockets opening at the respective surfaces and provided in circumferential and axial rows, i.e. an angular equispaced axial rows of spaced apart mixing chambers.

The mixing chambers are elongated so that they have ends 5 which are semicircular and have, as can be seen in FIG. 1, a given radius R.

All of the mixing chambers 4 are formed identically except for the mixing chambers 4' at the downstream ends of the rotor and the mixing chambers 4" at the upstream end, where the rotor 2 has a somewhat frustoconical configuration and thus the mixing chambers have other than truly identical form to the mixing chambers inwardly of these frustoconical parts 6' and 6", respectively. The stator can have frustoconical parts as well although these have not been shown in the drawing, so as to follow the contours of the rotor.

The number of mixing chambers in each circumferential row and in each axial row of the rotor 2 is equal to the number of mixing chambers of each circumferential and axial row of the stator. However, the circumferential rows of the rotor 2 are axially offset from the circumferential rows of the stator 1 by ½ the length L of the mixing chamber.

Figure 4:
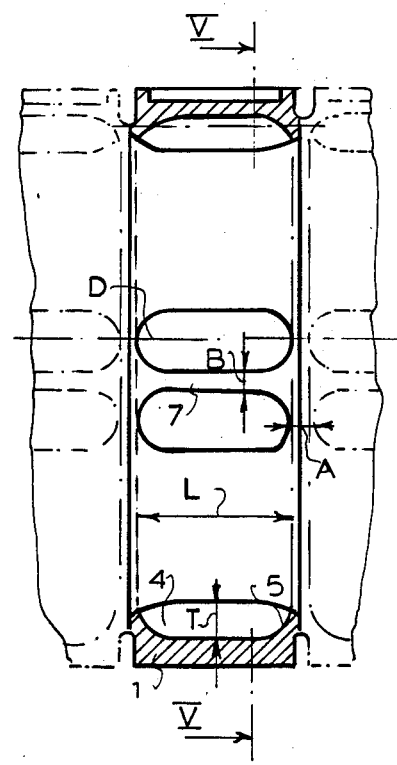
FIG. 4 is an axial section drawn to a slightly larger scale than that of FIG. 1, of a stator ring of a stator of a mixing device according to the invention.

As will be apparent from a comparison of FIGS. 1 and 4, the mixing chambers 4 have front and rear semicircular ends with the aforementioned given radius R.

Figure 5:
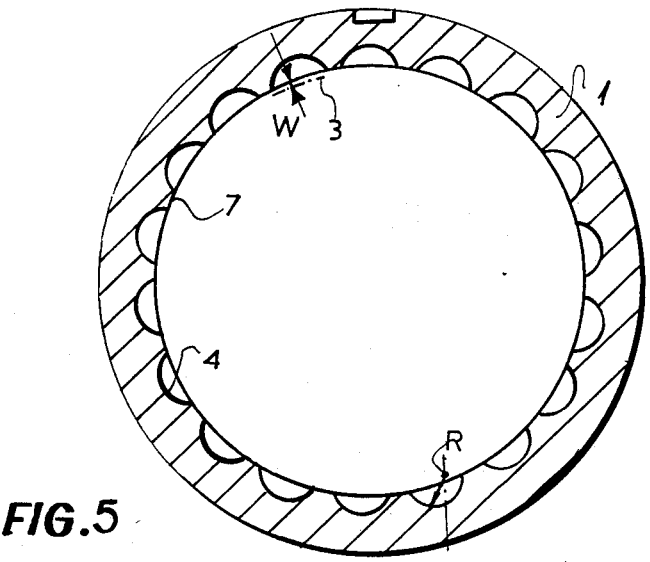
FIG. 5 is a section taken along the line V—V of FIG. 4.

From FIGS. 2 and 5 it can be seen that the mixing chambers 9 are troughs which in a radial cross section, have circular arc configurations with the same radius of curvature R.

The trough depth T, however, is less than the given radius R (see FIG. 3).

The mixing chambers 4 have a length L of 3 to 4 times the radius R (L=3R to 4R).

In the best mode embodiment of the invention, L equals 50 mm. The web 7 between mixing chambers 4 in the surface of rotor or stator 1 have a web width B which is smaller than ½ the given radius (B<R/2). The shear gap width W between the 2 surfaces which has not been identified in the drawing because of the scale thereof should be less than R/2 and preferably less than R/4.

From FIGS. 1 and 4 it will be clear that the mixing chambers 4 have a spacing A in the axial direction which is about ⅓ of the given radius R. In the best mode embodiment the diameter D of the rotor 2 can be about 100 mm while the given radius R is 10 to 20 mm and preferably is about 15 mm.

The length L of the mixing chambers 4 should be greater with decreasing trough depth.

Turning again to FIG. 6 it will be apparent that three thermally insulated lines 9., which can be rigid conduits or flexible pipes connect the extruder 20 to the mixing units 25. If desired, gear pumps or other positive displacement pumps can be provided in these conduits between the screw press 20 and the mixing units.

From the drawing it is also clear that each of the rotors 2 has a respective drive 10 which can be controlled by a respective control unit, one of which has been shown at 27. This motor control unit is independent of the motor control unit 28 or the drive 22 of the worm.

A the thermoplastified flow from the extruder is forced through the gaps 3, additives can be forced into the gaps by inlets 29 and via pumps 30 which themselves can be provided with control or regulating units represented at 31.

Each of the stators 1, formed from the rings shown in FIGS. 4 and 5 an axially abutting relationship, can be heated as represented by the thermal conductors 12 and the heating units 32. A regulating system represented by the microprocessor based control 33 can receive inputs from sensors 34 measuring the temperature, for example, of the additives and from sensors 35, measuring the flow rate and temperature of the main thermoplastified flow to control the heating units. Of course, the stator can also be driven and the rotor held stationary or both can rotate in opposite senses.

We claim:

1. An apparatus for blending a pumpable additive with a flow of a thermoplastified synthetic resin, comprising:
  a worm press having:
    a cylinder,
    a plastifying screw rotatable in said cylinder and generating a flow of a thermoplastified synthetic resin fed to said worm press whereby said synthetic resin is thermoplastified therein and displaced in a flow along said worm press, and
    a worm-press drive connected to said screw for driving same;
  at least one mixing device communicating with said worm press, receiving said flow therefrom and driven independently from said worm press, said mixing device comprising:
    a rotor along the path of said flow rotating with having a peripheral surface,
    a stator surrounding said rotor having a peripheral surface juxtaposed with said peripheral surface of said rotor so that said surfaces define an axially-extending annular gap between them, each of said surface being formed with a plurality of angularly equispaced axially extending rows of axially elongated mixing chambers of identical outline each with semicircular ends of a given radius, the mixing chambers of said surface of said rotor being axially offset from the mixing chambers of said surface of said stator by substantially half the length of said mixing chambers, said mixing chambers being troughs of circular arc segmental cross section with radii of curvature equal to said given radius and depths less than said given radius, the length of each mixing chamber being three to four times said given radius, the mixing chambers of successive rows of each surface being separated by webs having a thickness less than half of said given radius and said gap 33 having a gap width generating a shear velocity gradient sufficient to effect intimate mixing in said gap of said flow as said flow passes through said gap, and
    a mixing-unit drive operatively connected with said rotor for driving same independently of said screw; and
  a pump communicating with a source of a pumpable additive to be admixed with said flow connected to said stator at at least one location around said rotor and at an upstream end of said gap, for feeding said pumpable additive into said gap for admixture to said thermoplastified synthetic resin, thereby blending said additive with said thermoplastified synthetic resin.

2. The apparatus defined in claim 1, further comprising means for heating said stator.

3. The apparatus defined in claim 2, further comprising means for controlling said heating means.

4. The apparatus defined in claim 1 wherein said pump is dimensioned to feed said additive is fed to said location at a static pressure greater than a static pressure of said flow at said location.

5. The apparatus defined in claim 1, further comprising means for independently controlling the speeds of said screw and said rotor.

6. A method of blending a pumpable additive with a flow of a thermoplastified synthetic resin, comprising the steps of:

(a) generating a flow of a thermoplastified synthetic resin by rotatably driving a plastifying screw in a cylinder of a synthetic-resin-displacing worm press and feeding the synthetic resin to said worm press whereby said synthetic resin is thermoplastified therein and displaced in a flow along said worm press and from said worm press;

(b) along the path of said flow but separately from said worm press, rotating a rotor independently of the rotation of said screw and having a peripheral surface juxtaposed with a peripheral surface of a stator surrounding said rotor so that said surfaces define an axially extending annular gap between them, each of said surfaces being formed with a plurality of angularly equispaced axially extending rows of axially elongated mixing chambers of identical outline each with semicircular ends of a given radius, the mixing chambers of said surface of said rotor being axially offset from the mixing chambers of said surface of said stator by substantially half the length of said mixing chambers, said mixing chambers being troughs of circular arc segmental cross section with radii of curvature equal to said given radius and depths less than said given radius, the length of each mixing chamber being three to four times said given radius, the mixing chambers of successive rows of each surface being separated by webs having a thickness less than half of said given radius and said gap having a gap width generating a shear velocity gradient sufficient to effect intimate mixing in said gap;

(c) passing said flow through said gap; and (d) pumping into said gap at at least one location around said rotor and at an upstream end of said gap, at least one pumpable additive miscible with said thermoplastified synthetic resin, thereby blending said additive with said thermoplastified synthetic resin.

7. The method defined in claim 6, further comprising the step of heating said stator.

8. The method defined in claim 7 wherein said stator is heated in response to a measurement of said flow and the temperature of the additive supplied to said gap.

9. The method defined in claim 6, further comprising the step of feeding said additive to said location at a static pressure which is greater than a static pressure of said flow at said location.

* * * * *